United States Patent Office 3,787,446
Patented Jan. 22, 1974

3,787,446
PROCESS FOR PRODUCING 3,5-DIHYDROXY
1,2-DIOXOLANES
Wolfgang Edl, Munich, Germany, assignor to Peroxid-Chemie GmbH., near Munich, Germany
No Drawing. Continuation-in-part of abandoned application Ser. No. 798,833, Nov. 20, 1968. This application Aug. 23, 1971, Ser. No. 174,262
Claims priority, application Netherlands, Nov. 23, 1967, 6715914
Int. Cl. C07d 13/00
U.S. Cl. 260—340.9        18 Claims

ABSTRACT OF THE DISCLOSURE 3,5-dihydroxy 1,2-dioxolanes are prepared by reacting in the presence of a catalytic quantity of a base, a diketone having the formula

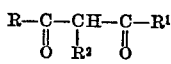

and hdyrogen peroxide wherein R and $R^1$ are alkyl groups having from 1 to 6 carbon atoms and $R^2$ is selected from the group consisting of hydrogen and alkyl groups having from 1 to 6 carbon atoms. When the reaction is conducted in the presence of an organic diluent in which the reaction product is insoluble, it is desirable to use concentrations of hydrogen peroxide in excess of 50% w./w. and the use of such diluents is desirable due to the formation of a granular product. The reaction may also be conducted in the presence of an organic solvent such as an organic acid corresponding to the diketone reactant which dissolves the dioxolane product. The use of an organic solvent is advantageous for producing substantially pure products with minimum purification. The 3,5-dihydroxy-1,2-dioxolanes are useful in the polymerization of vinyl compounds or in the cross-linking of unsaturated polyester resins.

---

This invention relates to a process for the production of peroxygen compounds, and particularly, to the production of 3,5-dihydroxy 1,2-dioxolanes. This application is a continuation-in-part of my co-pending application, Ser. No. 798,833 filed Nov. 20, 1968, now abandoned.

The invention provides a process for the preparation of 3,5-dihydroxy-1,2-dioxolanes by conducting a reaction between a diketone and hydrogen peroxide in the presence of a catalytic quantity of base according to the equation

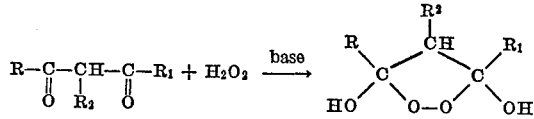

wherein R and $R^1$ are alkyl groups having from 1 to 6 carbon atoms and $R^2$ is a hydrogen atom or an alkyl group having from 1 to 6 carbon atoms.

The term "base" is used in the general sense to mean a proton acceptor. The term "catalytic quantity" is used to mean a quantity which will cause the reaction to proceed more quickly than if it had not been used as evidenced by the time required for crystallization of the reaction product to start. It will be appreciated that a soichiometric quantity of hydrogen peroxide may be employed or, if desired, the quantity of hydrogen peroxide may differ from the stoichiometric quantity without departing from the invention.

Diketones suitable for use in the above reaction tend to contain residual but appreciable quantities of an organic acid. Industrial grade acetyl acetone normally contains 1 to 5 grams acetic acid per liter.

In certain circumstances, it would be useful to perform the above reaction in the presence of an organic solvent to prevent the reaction product from crystallizing and to enable derivatives of the dissolved reaction product to be prepared by introducing other reactants into the resulting solution. Certain organic acids are very useful solvents for this latter purpose.

However, the presence of an acid in the reaction described above tends to cause the hydroxy groups of the dioxolane reaction product to react with any residual quantities of hydrogen peroxide present and form hydroperoxy groups reducing the yield and introducing impurities. Traces of acid adhering to 3,5-dihydroxy 3,5-dimethyl 1,2-dioxolane may cause the formation of shock-sensitive trisperoxide.

R and $R^1$ are usually the same; contain from 1 to 6 carbon atoms and preferably are both methyl radicals. $R^2$ may be hydrogen or an alkyl radical containing from 1 to 6 carbon atoms, but is preferably hydrogen or a methyl radical.

When the reaction is conducted in the presence of an organic solvent, hydrogen peroxide of at least 50% w./w. concentration is suitable and concentrations of at least 70% and, especiaally 80% w./w. are preferred. Commercially available hydrogen peroxide is often stabilized by the addition of acid.

The catalytic effect of a base in the process of the present invention exists in the presence of an acid and when the acid is not present in a large quantity, residual base used according to the invention may also help to neutralize residual quantities of the acid, thus also improving the stability of the reaction product.

The use of a base as a catalyst is, however, a critical feature of the invention while the specific diketone used is not. The invention is therefore also applicable to the manufacture of dioxolanes differing from those mentioned above in for example, having one or more of R, $R^1$ and $R^2$ containing more than 6 carbon atoms or in having an extra carbon atom in the dioxolane ring.

The selection of a suitable base as the catalyst is within the skill of the art. Generally moderate bases are preferred. Extremely weak bases, while having some effect, are not preferred since the substantial reduction in reaction time is not obtained, although the yield increases and extremely strong bases such as alkali or alkaline earth metal hydroxides catalyze the reaction, they decrease the yield of dioxolane by decomposition of the hydrogen peroxide unless neutralized prior to drying the products. Nonvolatile inorganic bases, such as oxides or carbonates of alkali or alkaline earth metals, are not preferred because they are more difficult to remove from the dioxolane product even though they exhibit good catalytic activity.

Amines or ammonia are useful as the base catalyst for practicing the present invention. Suitable amines include primary, secondary or tertiary amines, which may be aliphatic, aromatic or heterocyclic, ethyl amine, n-propyl amine, isopropyl amine, hexyl amine, octyl amine, dodecyl amine, 2-ethyl hexyl amine, 2,9-dimethyl decyl amine, tertiary butyl amine, cyclopentyl amine, cyclohexyl amine, aniline, o- or p-toluidine, diethyl amine, di-n-propyl amine, di-isopropyl amine, di-n-butyl amine, methyl aniline, diphenyl amine, triethyl amine, triamyl amine, triphenyl amine and dimethyl aniline. Tertiary heterocyclic amines, for example, pyridine; a lutidine, such as 2,4-lutidine, 2,6-lutidine and 3,4-lutidine; a collidine, such as $\alpha,\beta$ and $\gamma$-collidine; and quinoline or alkyl derivatives thereof such as 3-methyl quinoline, 2,6-dimethyl quinoline and 2,3,4-trimethyl quinoline are preferred. These compounds are highly effective catalysts in spite of their relatively low basicity, because they have no decomposing effect on hydrogen peroxide and are not oxidized by hydrogen peroxide. Aliphatic or aromatic amines, particularly if primary or secondary, may be oxidized to some degree by hydrogen peroxide but are, nevertheless, effective catalysts.

Preferably the base catalyst issued in a quantity of 0.1 to 1.0 mole per 100 moles of ketone. However, larger quantities up to 5 moles of base per 100 moles of ketone can be used particularly where the base selected as catalyst is a weak one.

When the preparation of 3,5-dihydroxy 1,2-dioxolanes is conducted in the presence of an organic solvent, the solvent, for example an organic acid, preferably corresponds to the diketone used. For example, when the diketone is acetyl acetone, the organic acid is preferably acetic acid and the quantity of acid is preferably sufficient to maintain the dioxolane product in solution. It is advantageous to treat the resulting solution by introducing a hydroperoxide, such as t-butyl hydroperoxide, and a small quantity of a strong acid such as $H_2SO_4$ or $HClO_4$ to form a solution containing a 3,5-dialkyl peroxy 1,2-dioxolane. A phlegmatiser, such as a phthalate ester for example dibutyl phthalate, may be added; the acid removed by washing with an aqueous 15% NaCl solution and the resulting phthalate solution of 3,5-t-butyl peroxy 1,2-dioxolane may be dried. Since 3,5-dihydroxy-1,2-dioxolanes are soluble in water it is desirable to use concentrated hydrogen peroxide in preparing these compounds by the above reaction to reduce the amount of dissolved reaction product in a state of dissociation equilibrium with the starting materials.

In order to minimize the dangerous properties of the dioxolanes, their preparation according to this invention may be carried out in the presence of inert hydrophilic solvents, such as trialkyl phosphates, alcohols, glycol, and glycol ethers and esters, and mixtures thereof. Such solutions show excellent stability.

In the absence of an organic solvent for the reaction product, hydrogen peroxide of 50% w./w. concentration or higher in the reaction tends to cause, after an initial delay, a relatively quick crystallization, which is difficult to control. When the diketone is acetyl acetone and the reaction is conducted in the absence of a solvent with a concentration of 50% w./w. or more, a solid damp mass of reaction product results.

If the reaction is conducted using a 50% w./w. concentration or higher of hydrogen peroxide in the presence of an organic diluent in which the reaction product is not soluble the consistency of the reaction mixture is improved and tends to form a granular product.

The selection of a suitable diluent involves a number of considerations amongst which are the solubility characteristic mentioned above; the desirably of the diluent to be hydrophilic so as to remove small amounts of water and/or residual hydrogen peroxide which may be present from the reaction; and the desirability of being reasonably volatile to enable easy removal from the solid, isolated reaction product by drying. A mixture of triethyl phosphate and methylene chloride is an example of a suitable diluent. However, common reduction of the reaction rate caused by the use of a diluent is considerably reduced by the present invention. This is an important advantage of the invention.

The production of 3,5-dihydroxy 1,2-dioxolanes by a reaction between a diketone and aqueous hydrogen peroxide of at least 50% w./w. concentration according to the equation

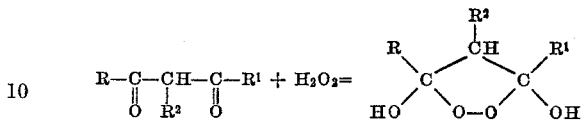

wherein R, $R^1$ and $R^2$ are as defined above; the reaction is conducted in the presence of an inert organic medium in which the 3,5-dihydroxy 1,2-dioxolane is insoluble in the presence of at least a catalytic quantity of a base is a particularly advantageous embodiment. Preferably the diketone is acetyl acetone. The preferred concentrations of hydrogen peroxide, identity of diketone, and quantity and identity of base are those set forth hereinabove.

Suitable diluents are alcohols, dioxan or tetrahydrofuran combined with low boiling halogenated hydrocarbons or with unsubstituted hydrocarbons. A mixture of triethyl phosphate and methylene chloride is preferred, particularly when the diketone is acetyl acetone. The quantity of diluent used should preferably be such that the reaction mixture does not solidify during the crystallization.

The crystalline precipitate of 3,5-dihydroxy 1,2-dioxolane may be filtered and dried.

In operating the process of this invention, preferably, the reactants other than the hydrogen peroxide, the diluent or solvent if used, are mixed and the hydrogen peroxide slowly added to the mixture, which is preferably cooled before addition of the hydrogen peroxide. Cooling the mixture to a temperature below about 10° C. is advantageous and preferably the reaction vessel is cooled so that the reaction temperature does not exceed 25° C.

The present invention also provides 3,5-dihydroxy 1,2-dioxolanes and particularly 3,5-dihydroxy 3,5-dimethyl 1,2-dioxolane whenever produced by the process described herein and the use of such dioxolanes in the polymerization of vinyl compounds or in the cross-linking or unsaturated polyester resins.

The following examples are presented to illustrate the present invention. Examples 7 to 25 demonstrate the invention while Examples 1 to 6 are presented for comparative purposes.

EXAMPLES 1–4

200.2 g. (2.0 mol) of industrial grade acetyl acetone was cooled by salt/ice or water in a vessel surrounding the reactor to the temperature reported in Table I and 2.0 mol of $H_2O_2$ of the reported concentration was added drop by drop with stirring. The end point of the reaction was apparent when 3,5 - dihydroxy - 3,5-dimethyl-dioxolane-1,2 ceased crystallizing and the temperature of the reaction mixture returned to that of the bath. The liquid was drained off the crystalline product which was washed and then dried for a period of 48 hours in an atmospheric air drying cabinet. The results of the reactions are reported in the following table.

TABLE I

| Ex. No. | Bath temp., °C. | $H_2O_2$ concentration, weight percent | $H_2O_2$ addition at Time (min.) | $H_2O_2$ addition at Max. temp., °C. | Start of crystallization | End of conversion reaction Minutes | End of conversion reaction Hours | Purity, percent | Yield of pure product, percent | Remarks |
|---|---|---|---|---|---|---|---|---|---|---|
| 1 | 2–5 | 50 | 25 | 3 | 225 | | 6 | 99.3 | 81.4 | Wash as in example. |
| 2 | 10 | 50 | 15 | 17 | [1]120 | | [2]6 | 100 | 87.8 | Crystallizable very hard had to be 'softened' with a triethyl phosphate/$CH_2Cl_2$ mixture before passing to the filter. |
| 3 | 7–10 | 60 | 33 | 14 | [1]180 | 10 | 5 | 94.6 | 87.9 | Single solid mass. Softened with ether. |
| 4 | 7–10 | 70 | 26 | 15 | [1]180 | 50 | 6 | | | Rock-hard product. Could not be transferred even with solvent was used. |

[1] Spontaneous rise in temperature here in spite of continuous cooling (in experiment 3 up to 19°).
[2] Subsequently stirred for a further hour.

EXAMPLES 5-23

200.2 g. (2.0 mole) of industrial grade acetyl acetone and 130 ml. of technical methylene chloride were placed in a reactor and brought to the initial temperature indicated in Table II by a cooling vessel surrounding the reactor. The amount of base reported in Table II was then added as a solution in water on methylene chloride adjusted so that the total amount of solution remained consistant. A mixture of 2.0 mol of 83.7% $H_2O_2$ 81.3 g.) and 40 g. of industrial grade triethyl phosphate was added drop by drop with stirring and continuous cooling to ensure, for safety reasons, that the internal temperature did not rise above 25°. Therefore, the addition had to be interrupted on occasion. The end of the reaction was reached when the internal temperature corresponded to that of the cooling vessel. In order to ensure complete crystallization, stirring was continued for 1 hour (Note: Triethyl phosphate was used to dilute the $H_2O_2$ to provide better control of the addition in this small-scale experiment but it is preferable to place triethyl phosphate in the receiving vessel because of the inherent danger in mixtures of high concentrations $H_2O_2$ with organic compounds.)

The mixture was drawn off using a suction filter and the crystals washed first with 120 ml. of a mixture of triethyl phosphate and methylene chloride (1:30 v./v.) and then with 120 ml. of methylene chloride and dried for 48 hours in a fresh air-oven. The results of Experiments 5-23 are reported in Table II.

EXAMPLE 25

14.4 g. of 82.8% $H_2O_2$ (0.35 mole) was added dropwise while stirring at a temperature of 12° C. and over a period of 15 mins. to a solution of 250 g. (0.25 mole) of technical grade acetyl acetone in 60 ml. of glacial acetic acid containing 0.1 mol percent 2,4,6-collidine. Stirring was continued for a further 30 mins. 50.6 g. of 89% (0.50 mole) technical grade t.butyl hydroperoxide was then added, followed by the dropwise addition of 12.5 ml. of 2 N sulphuric acid in glacial acetic acid. The temperature of the mixture was then raised to 30° for 1 hour.

After the addition of 70 g. of dibutyl phthalate (as a phlegmatising agent) the mixture was diluted with 200 ml. of 15% nalt solution. The separated organic phase was washed until it was neutral. After drying over sodium sulphate, 124.7 g. of phthalate solution containing 46.6% 3,5-bis-t.butyl-peroxy-3,5-dimethyl diololane-1,2 (83.6% of the theoretical yield( and a 0.8% t.butyl hydroperoxide content was obtained.

What is claimed is:

1. A process for preparing a 3,5-dihydroxy 1,2-dioxolane corresponding to the formula

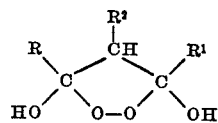

TABLE II

| Ex. No. | Bath temp., °C. | Base | Mole percent of base | $H_2O_2$ addition at— Time (min.) | $H_2O_2$ addition at— Max. temp., °C. | Time in minutes from starting $H_2O_2$ addition of— Start of crystallization Minutes | Time in minutes from starting $H_2O_2$ addition of— Start of crystallization Approximate hours | End of conversion reaction Minutes | End of conversion reaction Hours | Raw yield percent | Purity, percent | Yield of pure product, percent |
|---|---|---|---|---|---|---|---|---|---|---|---|---|
| 5 | 9 | Comparison | None | 15 | 12 | | 17 | | 19 | 62.3 | 100 | 62.3 |
| 6[1] | 9 | n-Methylprollidone | 5.0 | 10 | 11 | | 16 | | 17 | 68.7 | 100 | 68.7 |
| 7 | 9 | 2,4,6-collidine | 1.0 | 55 | [2]24 | 18 | | 120 | | 85.5 | 100 | 85.5 |
| 8 | 9 | 2,4,6-collidine | 0.1 | 47 | [2]27 | 13 | | 115 | | 86.0 | 95.8 | 82.0 |
| 9 | 8-9 | 2,4,6-collidine plus 10 ml. acetic acid. | 0.1 | 14 | 25 | 29 | | 124 | | 83.5 | 98.7 | 82.0 |
| 10 | 9 | 2,6-lutidine | 0.1 | 13 | [2]25 | 18 | | 95 | | 84.9 | 100 | 84.9 |
| 11 | 9 | Pyridine | 0.1 | 12 | [2]24 | 20 | | 90 | | 84.3 | 99.5 | 83.7 |
| 12 | 8 | Tri-isopropanolamine | 0.1 | 39 | [2]26 | 11 | | 100 | | 79.5 | 100 | 79.5 |
| 13 | 9-10 | $(C_2H_5)_3N$ | 0.1 | 52 | [2]25 | 14 | | 125 | | 82.5 | 100 | 82.5 |
| 14 | 7 | $C_6H_5N(CH_3)_2$ | 0.1 | 19 | 22 | 27 | | 90 | | 80.0 | 92.5 | 74.0 |
| 15 | 10 | Piperidine | 0.1 | 24 | [2]26 | 14 | | 100 | | 75.5 | 98.9 | 75.0 |
| 16 | 10 | do | 0.1 | 43 | [2]26 | 9 | | 137 | | 76.5 | 100 | 76.5 |
| 17 | 8-9 | Monoethanolamine | 0.1 | 13 | 18 | 29 | | 135 | | 83.5 | 97.3 | 81.5 |
| 18 | 9 | Imidazol | 0.1 | 39 | [2]24 | 10 | | 96 | | 79.5 | 98.5 | 78.2 |
| 19 | 9 | do | 1.0 | 45 | [2]23 | 11 | | 125 | | 59.0 | 98.9 | 58.0 |
| 20 | 8-9 | $NH_3$ | 1.0 | 46 | [2]24 | 12 | | 112 | | 82.7 | 100 | 82.7 |
| 21[3] | 9-11 | $Na_2CO_3$ | 0.1 | 51 | [2]27 | 16 | | 170 | | 24.6 | 98.3 | 24.2 |
| 22[4] | 10 | NaOH | 0.1 | 32 | [2]25 | 11 | | 86 | | 37.6 | 99.1 | 37.4 |
| 23 | 10 | NaOH | 0.1 | 38 | [2]25 | 10 | | 105 | | 65.3 | 98.7 | 65.0 |

[1] Comparison example using an acid amide.
[2] Immediate rapid rise in temperature, therefore slow dropwise addition with interruptions to prevent exceeding the 25° temperature limit.
[3] Decomposition during drying: of 285 g. of damp product only 66 g. of dry product remained.
[4] Decomposition during drying: of 307 g. of damp product only 101 g. of dry product remained.

EXAMPLE 24

Following the procedure of Examples 5-23 except that, following completion of the reaction and before drawing off the mixture through the suction filter, the reaction mixture was neutralized by adding 5 ml. of 1 N $H_2SO_4$. The conditions and results are shown below in comparison with Example 21.

| Example | [1]24 | [2]21 |
|---|---|---|
| Bath temperature, °C | 9 | 9-11 |
| Base | $NA_2CO_3$ | $NA_2CO_3$ |
| Mole percent of base | 0.1 | 0.1 |
| $H_2O_2$ addition time, minutes | 45 | 51 |
| Maximum bath temp. during $H_2O_2$ addition, degree | 28 | 27 |
| Time in minutes from starting $H_2O_2$ addition: | | |
| a. Start of crystallization, minutes | 15 | 16 |
| b. End of conversion reaction, minutes | 150 | 170 |
| Raw yield, percent | 87.7 | 24.6 |
| Purity, percent | 97.9 | 98.3 |
| Yield of pure product, percent | 85.9 | 24.2 |

[1] This example includes a step of neutralization prior to filtration.
[2] Decomposition during drying reduced 285 grams of damp product to only 66 grams.

which comprises reacting in the presence of a catalytic quantity of a base, a diketone having the formula

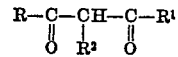

and hydrogen peroxide wherein R and $R^1$ are alkyl groups having from 1 to 6 carbon atoms and $R^2$ is selected from the group consisting of hydrogen and alkyl groups having from 1 to 6 carbon atoms.

2. A process according to claim 1 wherein the base is selected from the group consisting of an alkali metal oxide, an alkaline earth oxide, an alkali metal hydroxide, an alkaline earth hydroxide, an alkali metal carbonate, an alkaline earth carbonate, ammonia and an amine.

3. A process according to claim 1 wherein the base is a tertiary heterocyclic amine.

4. A process according to claim 1 wherein the base is selected from the group consisting of pyridine, lutidine, collidine, quinoline and alkyl derivatives thereof.

5. A process according to claim 1 wherein the base is an amine selected from the group consisting of primary, secondary and tertiary aliphatic, aromatic and heterocyclic amines.

6. A process according to claim 1 wherein the base is selected from the group consisting of pyridine, triisopropanolamine, triethylamine, phenyl dimethylamine, piperidine, monoethanolamine and imidazole.

7. A process according to claim 1 wherein the base is ammonia.

8. A process according to claim 1 wherein the base is used in a quantity of 0.1 to 5.0 moles per 100 moles of said diketone.

9. A process according to claim 8 wherein the base is used in a quantity of from 0.1 to 1.0 mole per 100 moles of said diketone.

10. A process according to claim 1 wherein the reaction is conducted in the presence of a quantity of an organic solvent sufficient to dissolve the 3,5-dihydroxy 1,2-dioxolane being prepared.

11. A process according to claim 10 wherein the organic solvent is an organic acid having the formula RCOOH wherein R is an alkyl group having 1 to 6 carbon atoms.

12. A process according to claim 11 wherein dioxalane is 2,5-dihydroxy 2,5-dimethyl 1,2 dioxolane and the organic solvent is acetic acid.

13. A process according to claim 1 wherein the reaction is conducted in the presence of a hydrophilic organic diluent, said 2,5-dihydroxy 1,2-dioxolane is insoluble therein and said diluent is sufficiently volatile to be vaporized from the 2,5-dihydroxy 1,2-dioxolane by drying at a temperature below the decomposition temperature of said dioxolane.

14. A process as claimed in claim 13 wherein the organic diluent is a mixture selected from the group consisting of methylene chloride with triethyl phosphate, an alcohol with a hydrocarbon and dioxane and tetrahydrofuran with a hydrocarbon, said hydrocarbon being selected from the group consisting of low boiling halogenated and unsubstituted hydrocarbons.

15. A process according to claim 14 wherein the quantity of organic diluent is sufficient to prevent the reaction mixture from solidifying.

16. A process according to claim 10 wherein hydrogen peroxide is an aqueous solution having a concentration of at least 50% w./w.

17. A process for the preparation of 2,5-dihydroxy 2,5-dimethyl 1,2-dioxolane which comprises reacting acetylacetone and at least a 50% w./w. hydrogen peroxide solution in the presence of a catalytic quantity of a base and sufficient acetic acid to maintain said 2,5-dihydroxy 2,5-dimethyl 1,2-dioxolane in solution.

18. A process as claimed in claim 17 wherein the base is selected from the group consisting of pyridine, lutidine, collidine and quinoline, is present in 0.1 to 1.0 mole per 100 moles of acetyl acetone and the reaction is conducted in the presence of an organic diluent comprising a mixture of methylene chloride and triethyl phosphate.

References Cited
FOREIGN PATENTS
1,800,228   7/1969   Germany _____ 260—340.9

ALEX MAZEL, Primary Examiner

J. H. TURNIPSEED, Assistant Examiner